(12) United States Patent
Xu et al.

(10) Patent No.: US 12,505,894 B2
(45) Date of Patent: Dec. 23, 2025

(54) SELECT GATE MAINTENANCE WITH ADAPTIVE SCAN FREQUENCY IN A MEMORY SUB-SYSTEM

(71) Applicant: Micron Technology, Inc., Boise, ID (US)

(72) Inventors: Zhongguang Xu, San Jose, CA (US); Murong Lang, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 245 days.

(21) Appl. No.: 18/384,716

(22) Filed: Oct. 27, 2023

(65) Prior Publication Data

US 2024/0153570 A1 May 9, 2024

Related U.S. Application Data

(60) Provisional application No. 63/423,913, filed on Nov. 9, 2022.

(51) Int. Cl.
*G11C 16/26* (2006.01)
*G11C 16/34* (2006.01)

(52) U.S. Cl.
CPC .......... *G11C 16/3495* (2013.01); *G11C 16/26* (2013.01); *G11C 16/3404* (2013.01)

(58) Field of Classification Search
CPC . G11C 16/3495; G11C 16/26; G11C 16/3404; G11C 29/52; G11C 2029/0409
See application file for complete search history.

(56) References Cited

U.S. PATENT DOCUMENTS 11,017,870 B1 * 5/2021 Batutis ................. G11C 16/349

* cited by examiner

*Primary Examiner* — Xiaochun L Chen
(74) *Attorney, Agent, or Firm* — LOWENSTEIN SANDLER LLP

(57) ABSTRACT

A processing device, operatively coupled with a memory device, determines a number of program/erase cycles performed on a block of the memory device. The processing device determines that the number of program/erase cycles performed on the block satisfies a first threshold criterion, wherein the first threshold criterion corresponds to a frequency interval for performing a threshold voltage integrity scan on the block. The processing device performs a threshold voltage integrity scan on the block to determine an error count associated with a current threshold voltage of at least one select gate device of the block. Responsive to the error count associated with the current threshold voltage of the at least one select gate device satisfying a second threshold criterion, the processing device determines a rate of change associated with the current threshold voltage of the at least one select gate device. The processing device updates, based on the rate of change, the frequency interval for performing a threshold voltage integrity scan on the block.

20 Claims, 8 Drawing Sheets

| Entry 401 | Rate of Change Threshold Window 403 | Frequency Interval 405 | Bit Flag 405 |
|---|---|---|---|
| 1 | [Th2, Th1] | 100 | 111 |
| 2 | [Th3, Th2] | 200 | 110 |
| 3 | [Th4, Th3] | 500 | 101 |
| 4 | [Th5, Th4] | 1000 | 100 |
| 5 | [Th6, Th5] | 2000 | 011 |
| 6 | [0, Th6] | 3000 | 010 |
| 7 | Default | 20000 | 000 |

SELECT GATE MAINTENANCE WITH ADAPTIVE SCAN FREQUENCY IN A MEMORY SUB-SYSTEM

RELATED APPLICATIONS

This application claims the priority and benefit of U.S. Provisional Application No. 63/423,913, filed on Nov. 9, 2022, the entire content of which is incorporated by reference herein.

TECHNICAL FIELD

Embodiments of the disclosure relate generally to memory sub-systems, and more specifically, relate to select gate maintenance with adaptive scan frequency in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
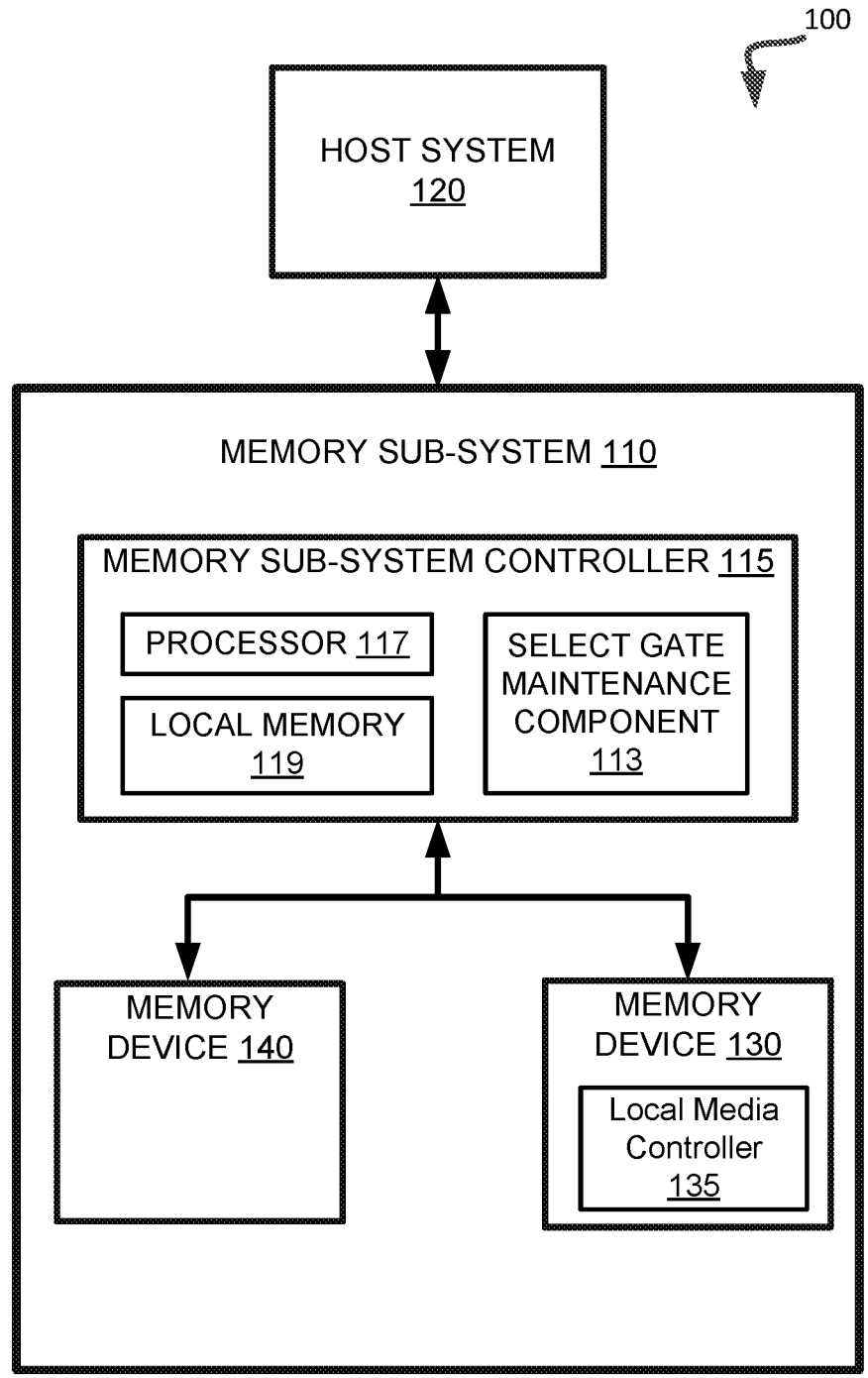
FIG. 1 illustrates an example computing system that includes a memory sub-system, in accordance with some embodiments of the present disclosure.

Aspects of the present disclosure are directed to select gate maintenance with adaptive scan frequency in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a wordline group, a wordline, or individual memory cells. Memory pages (also referred to herein as "pages") store one or more bits of binary data corresponding to data received from the host system. The memory cells of a block can be arranged along a number of separate wordlines.

Each block can include a number of sub-blocks, where each sub-block is defined by an associated pillar (e.g., a vertical conductive trace) extending from a shared bitline. Since the sub-blocks can be accessed separately (e.g., to perform program or read operations), the block can include a structure to selectively enable the pillar associated with a certain sub-block, while disabling the pillars associated with other sub-blocks. This structure can include one or more select gate devices positioned at either or both ends of each pillar. Depending on a control signal applied, these select gate devices can either enable or disable the conduction of signals through the pillars. In some embodiments, the select gates devices associated with each pillar in the block are controlled separately.

Certain memory devices can implement these select gate devices using floating gate transistors having a relatively long channel that provides good signal isolation when in the appropriate state. Other memory devices, however, can implement these select gate devices using replacement gate transistors which have a relatively short channel. The replacement gate transistors are programmable devices and thus offer the benefit of more versatility, but are susceptible to some amount of signal leakage. In addition, the programmable threshold voltage of replacement gate transistors can shift over time. While initially set at a certain target value or window, numerous factors including a number of program/erase cycles performed on the device, temperature changes, etc. can cause the threshold voltage of the select gate device to increase or decrease over time. This shift away from the target value/window can lead to charge loss causing the select gate device to function improperly, and potentially causing reliability problems in the data stored at the memory cells along the wordlines of the corresponding sub-block.

Due to the shift in the threshold voltage away from the target value/window, certain memory devices periodically perform a threshold voltage integrity scan to determine the threshold voltage of each select gate device. If the threshold voltage of a select gate device is higher than the target value/window, certain memory devices retire the block corresponding to that select gate device. If the threshold voltage of a select gate device is lower than the target value/window, certain memory devices perform touch up operations on the select gate device to adjust the threshold voltage of the select gate device back to the target value/window threshold voltage. Periodically scanning the threshold voltage of the select gate device can be based on a default/constant program/erase cycle interval/frequency. For example, the scan can occur at every 20,000 program/erase cycles. However, the default program/erase cycle interval is often set based on media characterization and offline testing, such as based on the characteristics of the worst die of a memory device. Since not all dice behave the same, some dice can benefit from touch up operations at different program/erase cycle intervals than the default program/erase cycle interval. Further, the threshold voltage degradation behavior of a select gate device can be different after a touch up operation is performed. Thus, being able to perform subsequent touch up operations at different program/erase cycle intervals than the default can be beneficial. Further, certain memory devices perform threshold voltage integrity scans sequentially from die to die, which can be a slow process and cause potential host device timeout (also referred to as "drive drop") concerns. In addition, performing threshold voltage integrity scans at a constant program/erase cycle interval can also result in intensive scans during certain time frames, which can impact quality of service (QoS).

Aspects of the present disclosure address the above and other deficiencies by performing select gate maintenance in a memory sub-system using an adaptive scan frequency. In some embodiments, a memory sub-system controller determines a number of program/erase cycles performed on a block of a memory device. The memory sub-system controller determines whether the number of program/erase cycles satisfies a scan threshold condition. The scan threshold criterion can be a frequency interval (e.g., a threshold number of program/erase cycles) for performing a threshold voltage integrity scan on the block. Satisfying the scan threshold criterion can include determining that the number of program/erase cycles is greater than or equal to the frequency interval (e.g., the threshold number of program/erase cycles). In response to determining that the number of program/erase cycles satisfies the scan threshold criterion, the memory sub-system controller can perform a threshold voltage integrity scan on the block to determine an error rate associated with the current threshold voltage of at least one select gate device of the block. If the error rate associated with the current threshold voltage of at least one select gate device satisfies an error threshold criterion (e.g., is less than a threshold error count), the memory sub-system controller can determine a rate of change (i.e., slope) associated with the current threshold voltage of the at least one select gate device. The memory sub-system controller can update, based on the determined rate of change, the frequency interval for performing a threshold voltage integrity scan on the block. For example, the memory sub-system controller can update the threshold number of program/erase cycles for performing a threshold voltage integrity scan on the block. The memory sub-system controller can use the updated frequency interval to determine when to perform a subsequent threshold voltage integrity scan. For example, the memory sub-system controller can determine a new number of program/erase cycles performed on the block and determine whether the new number of program/erase cycles is greater than or equal to the updated frequency interval (e.g., is greater than or equal to the threshold number of program/erase cycles). In some embodiments, if the error rate does not satisfy the error threshold criterion (e.g., is greater than or equal to the threshold error count), the memory sub-system controller can perform a touch operation on the at least one select gate device to adjust the current threshold voltage to a target threshold voltage. In some embodiments, if the error rate does not satisfy the error threshold criterion (e.g., is greater than or equal to the threshold error count), the memory sub-system controller can retire the block.

Adapting the frequency of performing threshold voltage integrity scans on a block of a memory device each time a scan is performed can ensure that the threshold voltages of the select gate devices in a data block do not shift too far away from the target threshold voltage at which the select gate devices are designed to operate. This causes the select gate devices to be enabled and disabled correctly in response to receiving corresponding control signals. This improves the integrity of data stored in the sub-blocks controlled by each respective select gate device, as operations (e.g., program or read operations) can be focused on an intended sub-block without causing unwanted effects on the other sub-blocks of the block. In addition, the threshold voltage of a select gate device can be corrected before shifting so far away from the target voltage that the select gate becomes unrepairable, and preventing the need to retire the block entirely. Further, since threshold voltage integrity scans are performed at an adaptive program/erase cycle interval/frequency instead of at a constant interval/frequency, there can be improved coverage of threshold voltage degradation of select gate devices. There can also be an improvement in quality of service (QoS) by avoiding intensive scans during certain time frames.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In some embodiments, the memory sub-system 110 includes a select gate maintenance component 113 that can be used to perform select gate maintenance with an adaptive scan frequency in a block of memory device 130 or memory device 140. The select gate maintenance component 113 determines a number of program/erase cycles performed on a block of a memory device. The select gate maintenance component 113 determines whether the number of program/erase cycles satisfies a scan threshold condition. The scan threshold criterion can be a frequency interval (e.g., a threshold number of program/erase cycles) for performing a threshold voltage integrity scan on the block. Satisfying the scan threshold criterion can include determining that the number of program/erase cycles is greater than or equal to the frequency interval (e.g., the threshold number of program/erase cycles). In response to determining that the number of program/erase cycles satisfies the scan threshold criterion, the select gate maintenance component 113 can perform a threshold voltage integrity scan on the block to determine an error rate associated with the current threshold voltage of at least one select gate device of the block. If the error rate associated with the current threshold voltage of at least one select gate device satisfies an error threshold criterion (e.g., is less than a threshold error count), the select gate maintenance component 113 can determine a rate of change (i.e., slope) associated with the current threshold voltage of the at least one select gate device. The select gate maintenance component 113 can update, based on the determined rate of change, the frequency interval for performing a threshold voltage integrity scan on the block. For example, the select gate maintenance component 113 can update the threshold number of program/erase cycles for performing a threshold voltage integrity scan on the block. The select gate maintenance component 113 can use the updated frequency interval to determine when to perform a subsequent threshold voltage integrity scan. For example, the select gate maintenance component 113 can determine a new number of program/erase cycles performed on the block and determine whether the new number of program/erase cycles is greater than or equal to the updated frequency interval (e.g., is greater than or equal to the threshold number of program/erase cycles). In some embodiments, if the error rate does not satisfy the error threshold criterion (e.g., is greater than or equal to the threshold error count), the select gate maintenance component 113 can perform a touch up operation on the at least one select gate device to adjust the current threshold voltage to a target threshold voltage. In some embodiments, if the error rate does not satisfy the error threshold criterion (e.g., is greater than or equal to the threshold error count), the select gate maintenance component 113 can retire the block. Further details with regards to the operations of the select gate maintenance component 113 are described below.

Figure 2:
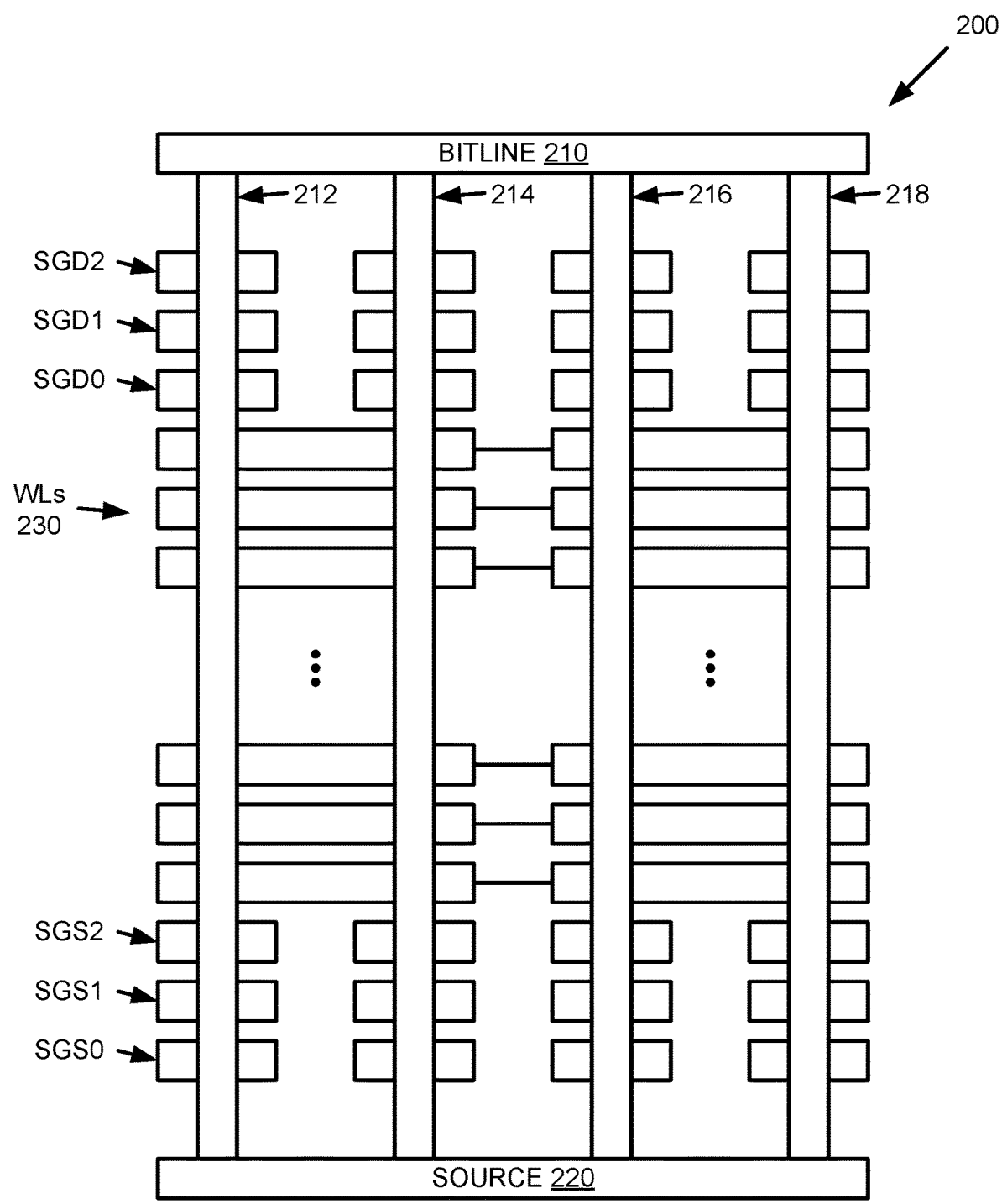
FIG. 2 is a block diagram illustrating select gate devices in a block of a memory device in a memory sub-system, in accordance with some embodiments of the present disclosure.

FIG. 2 is a block diagram illustrating select gate devices in a block of a memory device in a memory sub-system, in accordance with some embodiments of the present disclosure. In one embodiment, block 200 is representative of any of the blocks that make up memory device 130 or memory device 140. Block 200 can be one of a number of physical blocks in the memory device and can include a set of memory pages. The memory pages store one or more bits of binary data corresponding to data received from the host system. The memory cells of block 200 can be arranged along a number of separate wordlines 230. Block 200 can include a shared bitline 210 having a number of pillars 212, 214, 216, 218 extending therefrom to a separate source line 220. Each pillar can be a vertical conductive trace and the intersections of each of pillars 212, 214, 216, 218 and of each of wordlines 230 form the memory cells. Thus, each of pillars 212, 214, 216, 218 forms a separate sub-block within block 200, where each sub-block can be accessed separately. To enable an access operation, such as a program operation or a read operation, to be performed on a given sub-block, block 200 includes a number of select gate devices to selectively enable the pillar (e.g., pillar 212) associated with a certain sub-block, while disabling the pillars (e.g., pillars 214, 216, 218) associated with other sub-blocks. For example, each pillar can include a number of select gate devices (e.g., SGD0, SGD1, SGD2) at a first end (e.g., a drain end) and a number of select gate devices (e.g., SGS0, SGS1, SGS2) at a second end (e.g., a source end).

In some embodiments, the select gate devices in block 200 are formed using programmable replacement gate transistors. Thus, the select gate devices have a programmed threshold voltage. Depending on a magnitude of a control signal applied relative to the threshold voltage, the select gate devices can either enable or disable the conduction of signals through the corresponding pillar. For example, if the magnitude of the control signal applied to a select gate device is less than the threshold voltage, the select gate device can be turned off and can prevent signal flow through the corresponding pillar. Conversely, if the magnitude of the control signal is greater than the threshold voltage, the select gate device can be turned on and can permit signal flow through the corresponding pillar. In one embodiment, the select gates devices associated with each pillar in block 200 are controlled separately, such that signal flow can be prevented in certain pillars while permitted in other pillars at the same time. Replacement gate transistors have a relatively short internal channel length, and thus are susceptible to some amount of signal leakage. Accordingly, in one embodiment, each pillar in block 200 has multiple select gate devices at each of the drain end and the source end, effectively increasing the internal channel length to provide better signal isolation when turned off.

The programmable threshold voltage of the select gate devices can shift over time. While initially set at a certain target value, numerous factors, such as a number of program/erase cycles performed on the device, changes in temperature, etc., can cause the threshold voltage of a select gate device to increase or decrease over time. This shift away from the target value can lead to charge loss causing the select gate device to function improperly, and potentially causing reliability problems in the data stored on memory cells along the wordlines 230 of the corresponding sub-block. Accordingly, in some embodiments, select gate maintenance component 113 can periodically perform touch up operations on select gate devices SGD0, SGD1, SGD2 or SGS0, SGS1, SGS2 of block 200. In one embodiment, the touch up operation includes the select gate maintenance component 113 iteratively applying a series of program pulses to a select gate device to adjust a current threshold voltage of the select gate device back to a target threshold voltage, and verifying, after each iteration, whether the current threshold voltage has reached the target threshold voltage. Upon being returned to the target threshold voltage, the select gate device can function properly, such that it will turn on or off correctly in response to receiving a corresponding control signal.

Figure 3:
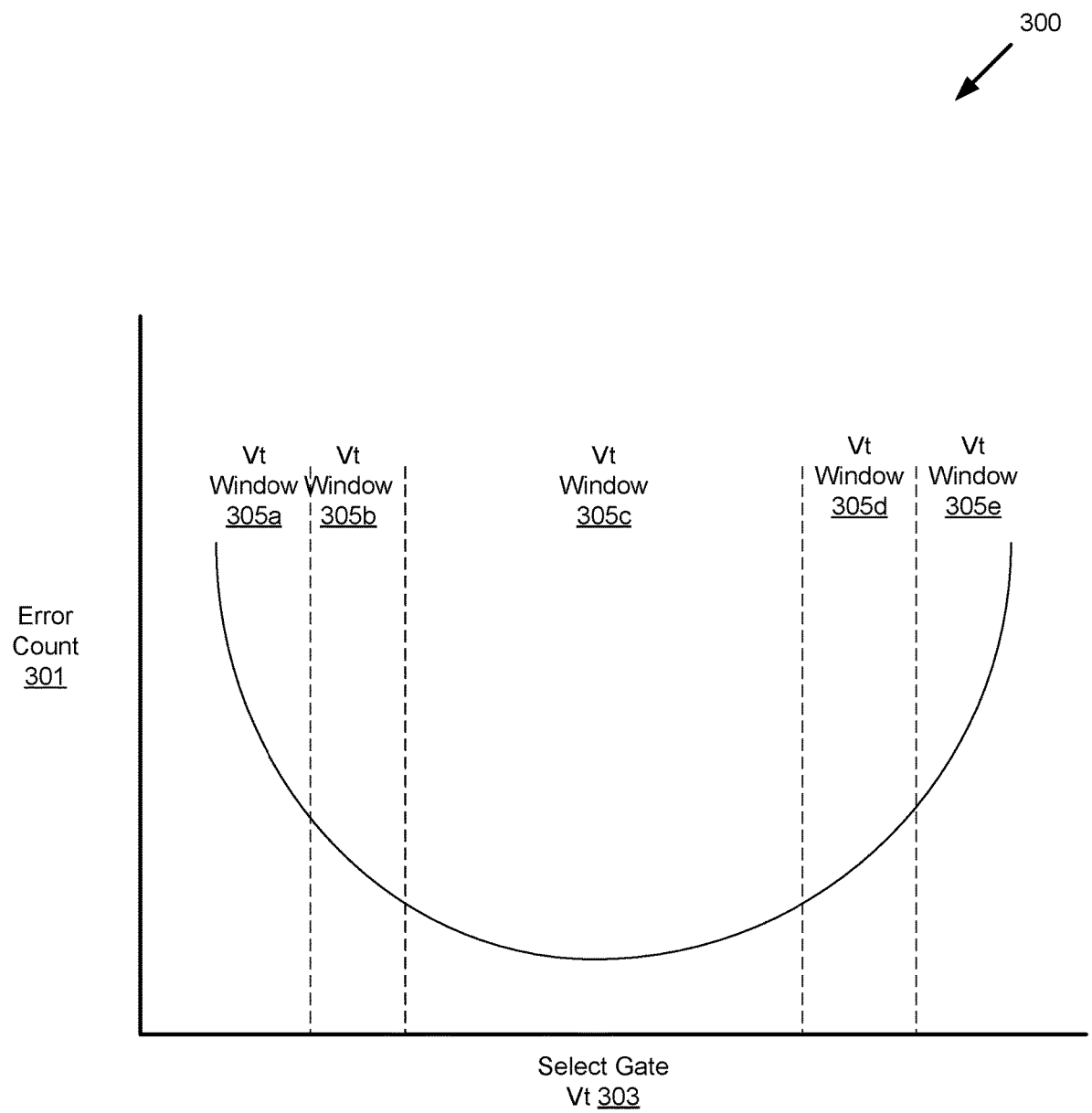
FIG. 3 is an example graph illustrating threshold voltage degradation of a select gate device, in accordance with some embodiments of the present disclosure.

FIG. 3 is an example graph illustrating threshold voltage degradation of a select gate device, in accordance with some embodiments of the present disclosure. As illustrated, the threshold voltage of a select gate device (i.e., Select Gate $V_t$ 303) can increase or decrease over time due to numerous factors, such as a number of program/erase cycles performed on the device, changes in temperature, etc. To ensure that blocks of the device are operating properly throughout the device's lifetime and to minimize an error count of the device (i.e., error count 301), the threshold voltage of the select gate device 303 should be maintained within a target threshold voltage window, such as threshold voltage $V_t$ Window 305c. If the threshold voltage of the select gate device 303 increases, the threshold voltage can fall within a threshold voltage $V_t$ Window 305d, which can lead to an increase in the error count 301 and a soft fail of the device. If the threshold voltage of the select gate 303 device increases further, the threshold voltage can fall within a threshold voltage $V_t$ Window 305e (e.g., a threshold voltage window that is higher than the $V_t$ Window 305d), which can lead to a higher increase in the error count 301 and a hard fail of the device. If the threshold voltage of the select gate device 303 decreases, the threshold voltage can fall within a threshold voltage $V_t$ Window 305b, which can lead to an increase in the error count 301 and a soft fail of the device. If the threshold voltage of the select gate device 303 decreases further, the threshold voltage can fall within a threshold voltage $V_t$ Window 305a (e.g., a threshold voltage window that is lower than the $V_t$ Window 305b), which can lead a higher increase in the error count 301 and a hard fail of the device.

Figure 4:
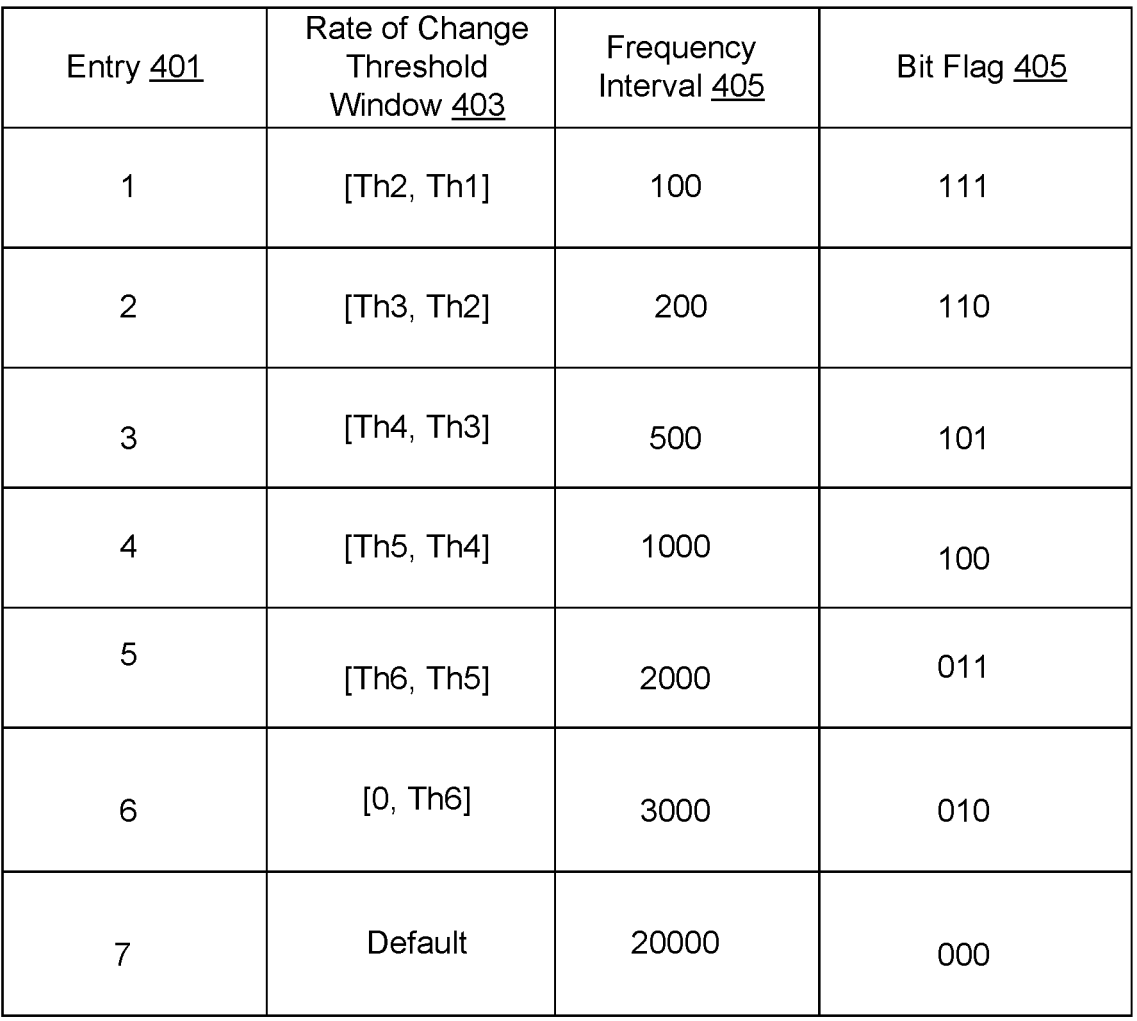
FIG. 4 is a block diagram illustrating an example look-up table described with reference to FIGS. 5-7, in accordance with some embodiments of the present disclosure.

FIG. 4 is a block diagram illustrating an example look-up table described with reference to FIGS. 5-7, in accordance with some embodiments of the present disclosure.

Figure 5:
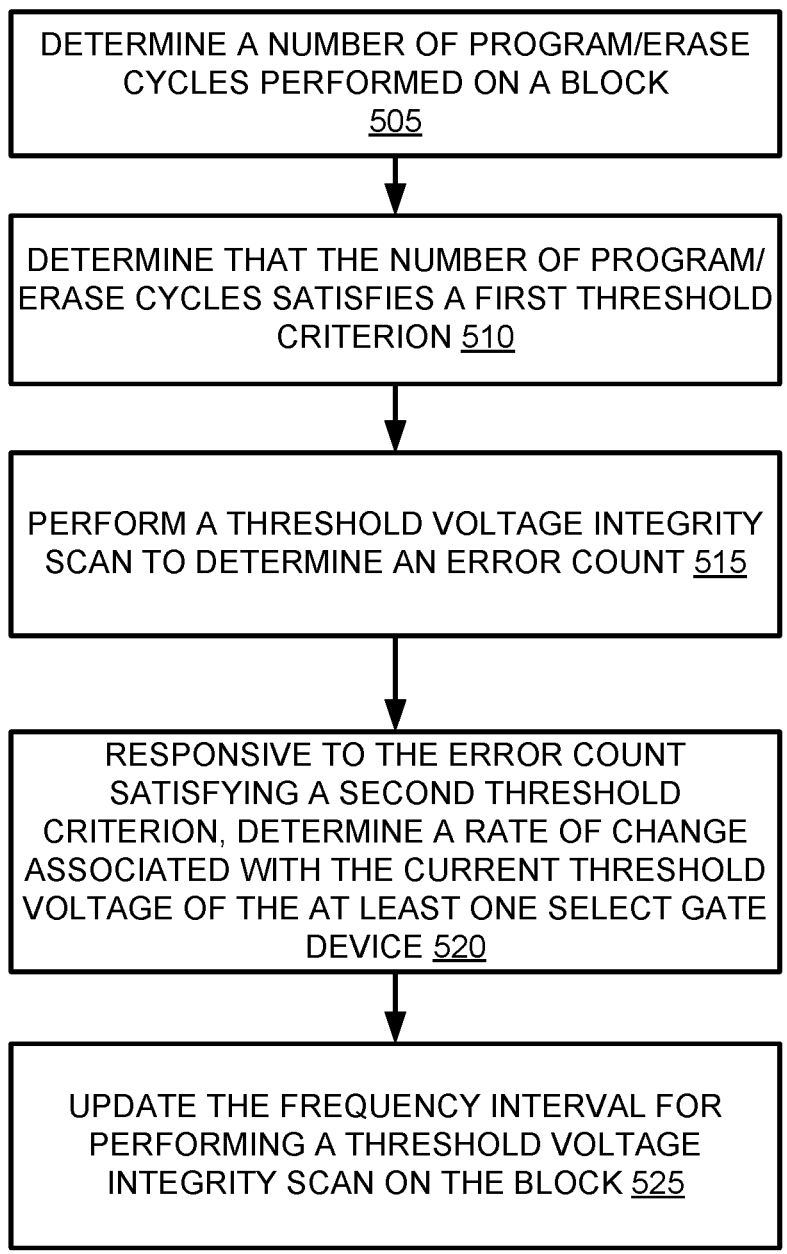
FIG. 5 is a flow diagram of an example method of performing select gate maintenance with adaptive scan frequency in a block of a memory device, in accordance with some embodiments of the present disclosure.

FIG. 5 is a flow diagram of an example method of performing select gate maintenance with adaptive scan frequency in a block of a memory device, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by select gate maintenance component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing logic determines a number of program/erase cycles performed on a block (e.g., the block 200 of FIG. 2) (i.e., a program/erase count (PEC)). A program/erase cycle can include data being programmed to block 200 and, subsequently, block 200 being erased. This process can occur many times over the lifespan of the block 200, as blocks are continually repurposed in a memory sub-system (e.g., the memory sub-system 110 of FIG. 1). In some embodiments, select gate maintenance component 113, or some other component in a memory sub-system controller (e.g., the memory sub-system controller 115 of FIG. 1) maintains a counter to track the number of program/erase operations performed on block 200. In some embodiments, the counter is maintained at the block level and is incremented each time a program/erase cycle is performed on block 200. In some embodiments, the counter is initialized at an initial value (e.g., 0) and is incremented in response to the program operations. Accordingly, the value of the counter represents the current program/erase count of the block 200.

At block 510, the processing logic determines that the number of program/erase cycles performed on the block satisfies a first threshold criterion. In some embodiments, the first threshold criterion is equal to a frequency interval for performing a threshold voltage integrity scan on the block. In some embodiments, determining that the number of program/erase cycles performed on the block satisfies the first threshold criterion includes determining that the number of program/erase cycles performed on the block is greater than or equal to a threshold number of program/erase cycles (e.g., the frequency interval). In some embodiments, the processing logic retrieves the frequency interval from a preconfigured table, such as a look-up table (e.g., the look-up table 400 of FIG. 4). In some embodiments, the first threshold criterion is a default frequency interval, such as the default frequency interval illustrated in the look-up table of FIG. 4 (e.g., 20000 program/erase cycles). In some embodiments, the default frequency interval can be defined during manufacturing based on testing or other diagnostics.

At block 515, the processing logic performs a threshold voltage integrity scan on the block. In some embodiments, the processing logic performs the threshold voltage integrity scan on the block to determine an error count associated with a current threshold voltage of at least one select gate of the block. During the threshold voltage integrity scan, the processing logic identifies one or more reliability statistics, such as the error count and/or a raw bit error rate (RBER) representing a number of bit errors per total number of bits that the select gate experiences. In some embodiments, during the scan, the processing logic applies one or more read voltages to the select gate device (e.g., SGD0 of FIG. 2) and receives one or more output values based on the one or more read voltages. For example, the processing logic reads a raw code word (i.e., a series of a fixed number of bits) from the select gate device SGD0, applies the code word to an error correcting code (ECC) decoder to generate a decoded code word, and compares the decoded code word to the raw code word (i.e., the expected output value). The processing logic can count a number of flipped bits between the decoded code word and the raw code word, with a ratio of the number of flipped bits to the total number of bits in the code word representing the RBER. The processing logic can repeat this process for additional code words until each of the select gate devices in the block have been scanned.

At block 520, the processing logic determines a rate of change (i.e., slope) associated with the current threshold voltage of the at least one select gate device. In some embodiments, the processing logic determines the rate of change in response to determining that the error count associated with the current threshold voltage of the at least one select gate device satisfies a second threshold criterion. In some embodiments, determining that the error count satisfies the second threshold criterion includes comparing the error count to the second threshold criterion, where the second threshold criterion is equal to a threshold error count. If the error count is less than the threshold error count, the error count satisfies the second threshold criterion. In some embodiments, the processing logic determines the rate of change using two points, e.g., the number of program/erase cycles performed on the block (e.g., the number of program/erase cycles determined at block 505) and the error count using a linear rate of change (i.e., slope) equation. For example, the processing logic can calculate the rate of change by dividing the error count by the number of program/erase cycles. In some embodiments, the processing logic determines the rate of change for a downward and/or upward shift in threshold voltage of the at least one select gate device. In some embodiments, the processing logic can retrieve an initial error count from a look-up table, such as the look-up table 400 of FIG. 4. The initial error count can be determined during manufacturing of the memory device based on offline testing and media characterization. In some embodiments, in response to determining the rate of change, the processing logic stores the rate of change (i.e., the current rate of change) and any previously calculated rate of change in a look-up table, such as the look-up table 400 of FIG. 4.

In some embodiments, in response to determining that the error count does not satisfy the second threshold criterion (e.g., the processing logic determines that the error count is equal to or greater than the threshold error count), the processing logic can perform a touch up operation on the at least one select gate device. In some embodiments, performing the touch up operation can adjust the current threshold voltage to a target threshold voltage. Performing the touch up operation can include iteratively applying one or more program pulses to the at least one select gate device, to a subset of the select gate devices of the block, or to all of the select gate devices of the block, to adjust the current threshold voltage of the select gate device(s) back to the target threshold voltage. The processing logic can verify, after each iteration, whether the current threshold voltage has reached the target threshold voltage, to ensure that the threshold voltage slowly steps back up to the target threshold voltage, without exceeding the target threshold voltage.

In some embodiments, in response to determining that the error count does not satisfy the second threshold criterion (e.g., the processing logic determines that the error count is equal to or greater than the threshold error count), the processing logic can retire the block. In some embodiments, retiring the block can include adding the block to a list of retired blocks in order to prevent new data from being written to the block in the future.

At block 525, the processing logic updates the frequency interval for performing a threshold voltage integrity scan on the block. In some embodiments, the processing logic updates the frequency interval based on the rate of change. In some embodiments, updating the frequency interval based on the rate of change includes retrieving a look-up table (e.g., the look-up table 400 of FIG. 4), where the look-up table includes one or more entries. Each entry of the look-up table can have a predefined frequency interval and a corresponding rate of change threshold window. In some embodiments, the processing logic can compare a value of the rate of change to each of the respective rate of change threshold windows of the one or more entries of the look-up table. The processing logic can determine a rate of change threshold window within which the value of the rate of change falls. For example, the processing logic can determine that the value of the rate of change falls within the rate of change threshold window [0, Th6] of FIG. 4. In response to determining that the value of the rate of change falls within the rate of change threshold window [0, Th6], the processing logic can identify the predefined frequency interval that corresponds to that rate of change threshold window (e.g., is in the same entry of the look-up table). For example, in FIG. 4, the processing logic can identify that frequency interval 3000 corresponds to rate of change threshold window [0, Th6] as it is the corresponding frequency interval for the rate of change threshold window [0, Th6] in entry 6. In some embodiments, in response to identifying the predefined frequency interval that corresponds to the rate of change threshold window within which the value of the rate of change falls within, the processing logic can update the frequency interval with the identified predefined frequency interval. Updating can include setting (e.g., replacing, defining, etc.) the frequency interval equal to the identified predefined frequency interval. For example, the processing logic can update the frequency interval to be 3000 according to the aforementioned example using FIG. 4.

Figure 6:
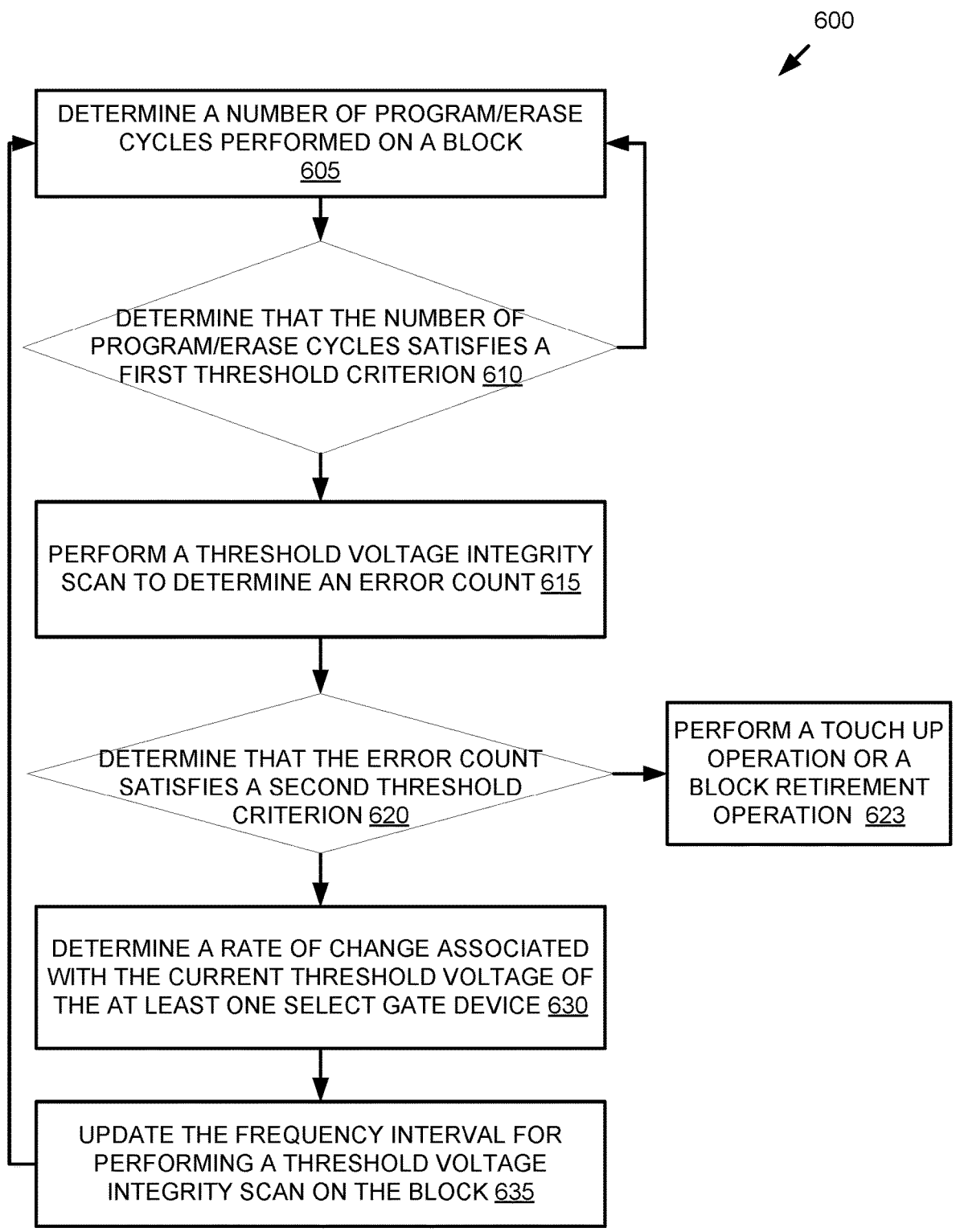
FIG. 6 is a flow diagram of an example method of performing select gate maintenance with adaptive scan frequency in a block of a memory device, in accordance with some embodiments of the present disclosure.

FIG. 6 is a flow diagram of an example method of performing select gate maintenance with adaptive scan frequency in a block of a memory device, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by select gate maintenance component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing logic determines a number of program/erase cycles performed on a block (e.g., the block 200 of FIG. 2) (i.e., a program/erase count (PEC)). A program/erase cycle can include data being programmed to block 200 and, subsequently, block 200 being erased. This process can occur many times over the lifespan of the block 200, as blocks are continually repurposed in a memory sub-system (e.g., the memory sub-system 110 of FIG. 1). In some embodiments, select gate maintenance component 113, or some other component in a memory sub-system controller (e.g., the memory sub-system controller 115 of FIG. 1) maintains a counter to track the number of program/erase operations performed on block 200. In some embodiments, the counter is maintained at the block level and is incremented each time a program/erase cycle is performed on block 200. In some embodiments, the counter is initialized at an initial value (e.g., 0) and is incremented in response to the program operations. Accordingly, the value of the counter represents the current program/erase count of the block 200.

At operation 610, the processing logic determines whether the number of program/erase cycles performed on the block satisfies a first threshold criterion. In some embodiments, the first threshold criterion is equal to a frequency interval for performing a threshold voltage integrity scan on the block. In some embodiments, determining that the number of program/erase cycles performed on the block satisfies the first threshold criterion includes determining that the number of program/erase cycles performed on the block is greater than or equal to a threshold number of program/erase cycles (e.g., the frequency interval). In some embodiments, the processing logic retrieves the frequency interval from a preconfigured table, such as a look-up table (e.g., the look-up table 400 of FIG. 4). In some embodiments, the first threshold criterion is a default frequency interval, such as the default frequency interval illustrated in the look-up table of FIG. 4 (e.g., 20000 program/erase cycles). In some embodiments, the default frequency interval can be defined during manufacturing based on testing or other diagnostics. In some embodiments, if the processing logic determines that the number of program/erase cycles performed on the block does not satisfy the first threshold criterion (e.g., is less than the threshold number of program/erase cycles), the processing logic returns to operation 605. If the processing logic determines that the number of program/erase cycles performed on the block does satisfy the first threshold criterion (e.g., is greater than or equal to the threshold number of program/erase cycles), the processing logic continues to operation 615.

At operation 615, the processing logic performs a threshold voltage integrity scan on the block. In some embodiments, the processing logic performs the threshold voltage integrity scan on the block to determine an error count associated with a current threshold voltage of at least one select gate of the block. During the threshold voltage integrity scan, the processing logic identifies one or more reliability statistics, such as the error count and/or a raw bit error rate (RBER) representing a number of bit errors per total number of bits that the select gate experiences. In some embodiments, during the scan, the processing logic applies one or more read voltages to the select gate device (e.g., SGD0 of FIG. 2) and receives one or more output values based on the one or more read voltages. For example, the processing logic reads a raw code word (i.e., a series of a fixed number of bits) from the select gate device SGD0, applies the code word to an error correcting code (ECC) decoder to generate a decoded code word, and compares the decoded code word to the raw code word (i.e., the expected output value). The processing logic can count a number of flipped bits between the decoded code word and the raw code word, with a ratio of the number of flipped bits to the total number of bits in the code word representing the RBER. The processing logic can repeat this process for additional code words until each of the select gate devices in the block have been scanned.

At operation 620, the processing logic determines whether the error count associated with the current threshold voltage of the at least one select gate device satisfies a second threshold criterion. In some embodiments, determining that the error count satisfies the second threshold criterion includes comparing the error count to the second threshold criterion, where the second threshold criterion is equal to a threshold error count. If the error count is less than the threshold error count, the error count satisfies the second threshold criterion. If the error count is greater than or equal to the threshold error count, the error count does not satisfy the second threshold criterion.

At operation 623, in response to determining at operation 620 that the error count does not satisfy the second threshold criterion, the processing logic performs a touch up operation on the at least one select gate device or retires the block. In some embodiments, performing the touch up operation can adjust the current threshold voltage to a target threshold voltage. Performing the touch up operation can include iteratively applying one or more program pulses to the at least one select gate device, to a subset of the select gate devices of the block, or to all of the select gate devices of the block, to adjust the current threshold voltage of the select gate device(s) back to the target threshold voltage. The processing logic can verify, after each iteration, whether the current threshold voltage has reached the target threshold voltage, to ensure that the threshold voltage slowly steps back up to the target threshold voltage, without exceeding the target threshold voltage. In some embodiments, retiring the block can include adding the block to a list of retired blocks in order to prevent new data from being written to the block in the future.

At operation 630, in response to determining at operation 620 that the error count satisfies the second threshold criterion, the processing logic determines a rate of change (i.e., slope) associated with the current threshold voltage of the at least one select gate device. In some embodiments, the processing logic determines the rate of change using two points, e.g., the number of program/erase cycles performed on the block (e.g., the number of program/erase cycles determined at block 505) and the error count using a linear rate of change (i.e., slope) equation. For example, the processing logic can calculate the rate of change by dividing the error count by the number of program/erase cycles. In some embodiments, the processing logic determines the rate of change for a downward and/or upward shift in threshold voltage of the at least one select gate device. In some embodiments, the processing logic can retrieve an initial error count from a look-up table, such as the look-up table 400 of FIG. 4. The initial error count can be determined during manufacturing of the memory device based on offline testing and media characterization. In some embodiments, in response to determining the rate of change, the processing logic stores the rate of change (i.e., the current rate of change) and any previously calculated rate of change in a look-up table, such as the look-up table 400 of FIG. 4.

At operation 635, the processing logic updates the frequency interval for performing a threshold voltage integrity scan on the block. In some embodiments, the processing logic updates the frequency interval based on the rate of change. In some embodiments, updating the frequency interval based on the rate of change includes retrieving a look-up table (e.g., the look-up table 400 of FIG. 4), where the look-up table includes one or more entries. Each entry of the look-up table can have a predefined frequency interval and a corresponding rate of change threshold window. In some embodiments, the processing logic can compare a value of the rate of change to each of the respective rate of change threshold windows of the one or more entries of the look-up table. The processing logic can determine a rate of change threshold window within which the value of the rate of change falls. For example, the processing logic can determine that the value of the rate of change falls within the rate of change threshold window [0, Th6] of FIG. 4. In response to determining that the value of the rate of change falls within the rate of change threshold window, the processing logic can identify the predefined frequency interval that corresponds to that rate of change threshold window (e.g., is in the same entry of the look-up table). For example, in FIG. 4, the processing logic can identify that frequency interval 3000 corresponds to rate of change threshold window [0, Th6] as it is the corresponding frequency interval for the rate of change threshold window [0, Th6] in entry 6. In some embodiments, in response to identifying the predefined frequency interval that corresponds to the rate of change threshold window within which the value of the rate of change falls within, the processing logic can update the frequency interval with the identified predefined frequency interval. Updating can include setting (e.g., replacing, defining, etc.) the frequency interval equal to the identified predefined frequency interval. For example, the processing logic can update the frequency interval to be 3000 according to the aforementioned example using FIG. 4.

Figure 7:
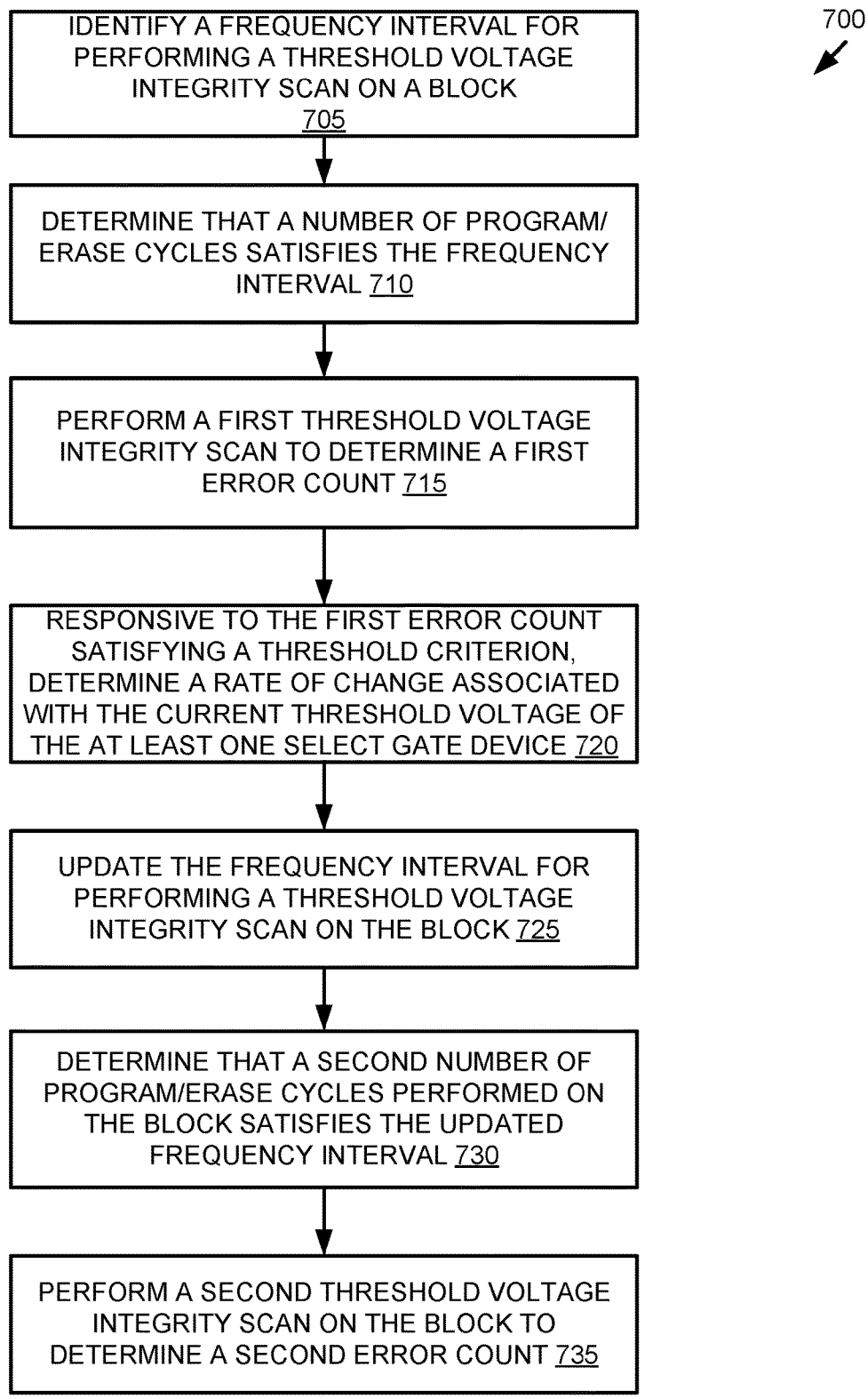
FIG. 7 is a flow diagram of an example method of performing select gate maintenance with adaptive scan frequency in a block of a memory device, in accordance with some embodiments of the present disclosure.

FIG. 7 is a flow diagram of an example method of performing select gate maintenance with adaptive scan frequency in a block of a memory device, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by select gate maintenance component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 705, the processing logic identifies a frequency interval for performing a threshold voltage integrity scan on a block of the memory device. In some embodiments, the processing logic retrieves the frequency interval from a preconfigured table, such as a look-up table (e.g., the look-up table 400 of FIG. 4). In some embodiments, the frequency interval is a default frequency interval, such as the default frequency interval illustrated in the look-up table of FIG. 4 (e.g., 20000 program/erase cycles). In some embodiments, the default frequency interval can be defined during manufacturing based on testing or other diagnostics.

At operation 710, the processing logic determines that a number of program/erase cycles performed on the block satisfies the frequency interval. In some embodiments, determining that the number of program/erase cycles performed on the block satisfies the frequency interval includes determining that the number of program/erase cycles performed on the block is greater than or equal to a threshold number of program/erase cycles (e.g., the frequency interval). In some embodiments, the processing logic determines the number of program/erase cycles performed on the block by maintaining a counter to track the number of program/erase operations performed on the block. In some embodiments, the counter is maintained at the block level and is incremented each time a program/erase cycle is performed on the block. In some embodiments, the counter is initialized at an initial value (e.g., 0) and is incremented in response to the program operations. Accordingly, the value of the counter represents the current program/erase count of the block.

At operation 715, the processing logic performs a threshold voltage integrity scan on the block. In some embodiments, the processing logic performs the threshold voltage integrity scan on the block to determine a first error count associated with a current threshold voltage of at least one select gate of the block. During the threshold voltage integrity scan, the processing logic identifies one or more reliability statistics, such as an error count (e.g., the first error count) and/or a raw bit error rate (RBER) representing a number of bit errors per total number of bits that the select gate experiences. In some embodiments, during the scan, the processing logic applies one or more read voltages to the select gate device (e.g., SGD0 of FIG. 2) and receives one or more output values based on the one or more read voltages. For example, the processing logic reads a raw code word (i.e., a series of a fixed number of bits) from the select gate device SGD0, applies the code word to an error correcting code (ECC) decoder to generate a decoded code word, and compares the decoded code word to the raw code word (i.e., the expected output value). The processing logic can count a number of flipped bits between the decoded code word and the raw code word, with a ratio of the number of flipped bits to the total number of bits in the code word representing the RBER. The processing logic can repeat this process for additional code words until each of the select gate devices in the block have been scanned.

At operation 720, the processing logic determines a rate of change (i.e., slope) associated with the current threshold voltage of the at least one select gate device. In some embodiments, the processing logic determines the rate of change in response to determining that the first error count associated with the current threshold voltage of the at least one select gate device satisfies a threshold criterion. In some embodiments, determining that the first error count satisfies the threshold criterion includes comparing the first error count to the threshold criterion, where the threshold criterion is equal to a threshold error count. If the first error count is less than the threshold error count, the error count satisfies the threshold criterion. In some embodiments, the processing logic determines the rate of change using two points, e.g., the number of program/erase cycles performed on the block (e.g., the number of program/erase cycles determined at block 505) and the first error count using a linear rate of change (i.e., slope) equation. For example, the processing logic can calculate the rate of change by dividing the first error count by the number of program/erase cycles. In some embodiments, the processing logic determines the rate of change for a downward and/or upward shift in threshold voltage of the at least one select gate device. In some embodiments, the processing logic can retrieve an initial error count from a look-up table, such as the look-up table 400 of FIG. 4. The initial error count can be determined during manufacturing of the memory device based on offline testing and media characterization. In some embodiments, in response to determining the rate of change, the processing logic stores the rate of change (i.e., the current rate of change) and any previously calculated rate of change in a look-up table, such as the look-up table 400 of FIG. 4.

In some embodiments, in response to determining that the first error count does not satisfy the threshold criterion (e.g., the processing logic determines that the first error count is equal to or greater than the threshold error count), the processing logic can perform a touch up operation on the at least one select gate device. In some embodiments, performing the touch up operation can adjust the current threshold voltage to a target threshold voltage. Performing the touch up operation can include iteratively applying one or more program pulses to the at least one select gate device, to a subset of the select gate devices of the block, or to all of the select gate devices of the block, to adjust the current threshold voltage of the select gate device(s) back to the target threshold voltage. The processing logic can verify, after each iteration, whether the current threshold voltage has reached the target threshold voltage, to ensure that the threshold voltage slowly steps back up to the target threshold voltage, without exceeding the target threshold voltage.

In some embodiments, in response to determining that the first error count does not satisfy the threshold criterion (e.g., the processing logic determines that the first error count is equal to or greater than the threshold error count), the processing logic can retire the block. In some embodiments, retiring the block can include adding the block to a list of retired blocks in order to prevent new data from being written to the block in the future.

At operation 725, the processing logic updates the frequency interval for performing a threshold voltage integrity scan on the block. In some embodiments, the processing logic updates the frequency interval based on the rate of change determined at operation 720. In some embodiments, updating the frequency interval based on the rate of change includes retrieving a look-up table (e.g., the look-up table 400 of FIG. 4), where the look-up table includes one or more entries. Each entry of the look-up table can have a predefined frequency interval and a corresponding rate of change threshold window. In some embodiments, the processing logic can compare a value of the rate of change to each of the respective rate of change threshold windows of the one or more entries of the look-up table. The processing logic can determine a rate of change threshold window within which the value of the rate of change falls. For example, the processing logic can determine that the value of the rate of change falls within the rate of change threshold window [0, Th6] of FIG. 4. In response to determining that the value of the rate of change falls within the rate of change threshold window [0, Th6], the processing logic can identify the predefined frequency interval that corresponds to that rate of change threshold window (e.g., is in the same entry of the look-up table). For example, in FIG. 4, the processing logic can identify that frequency interval 3000 corresponds to rate of change threshold window [0, Th6] as it is the corresponding frequency interval for the rate of change threshold window [0, Th6] in entry 5. In some embodiments, in response to identifying the predefined frequency interval that corresponds to the rate of change threshold window within which the value of the rate of change falls within, the processing logic can update the frequency interval with the identified predefined frequency interval. Updating can include setting (e.g., replacing, defining, etc.) the frequency interval equal to the identified predefined frequency interval. For example, the processing logic can update the frequency interval to be 3000 according to the aforementioned example using FIG. 4.

At operation 730, the processing logic determines that a second number of program/erase cycles performed on the block satisfies the updated frequency interval. In some embodiments, the processing logic can maintain a counter for the number of program/erase cycles performed on the block since the most recent threshold voltage integrity scan. In some embodiments, the processing logic can perform the operations described with respect to operation 730 herein to determine that the second number of program/erase cycles performed on the block satisfies the updated frequency interval.

At operation 735, the processing logic performs a second threshold voltage integrity scan on the block to determine a second error count. In some embodiments, the processing logic performs the second threshold voltage integrity scan using the operations described with respect to operation 715 herein.

Figure 8:
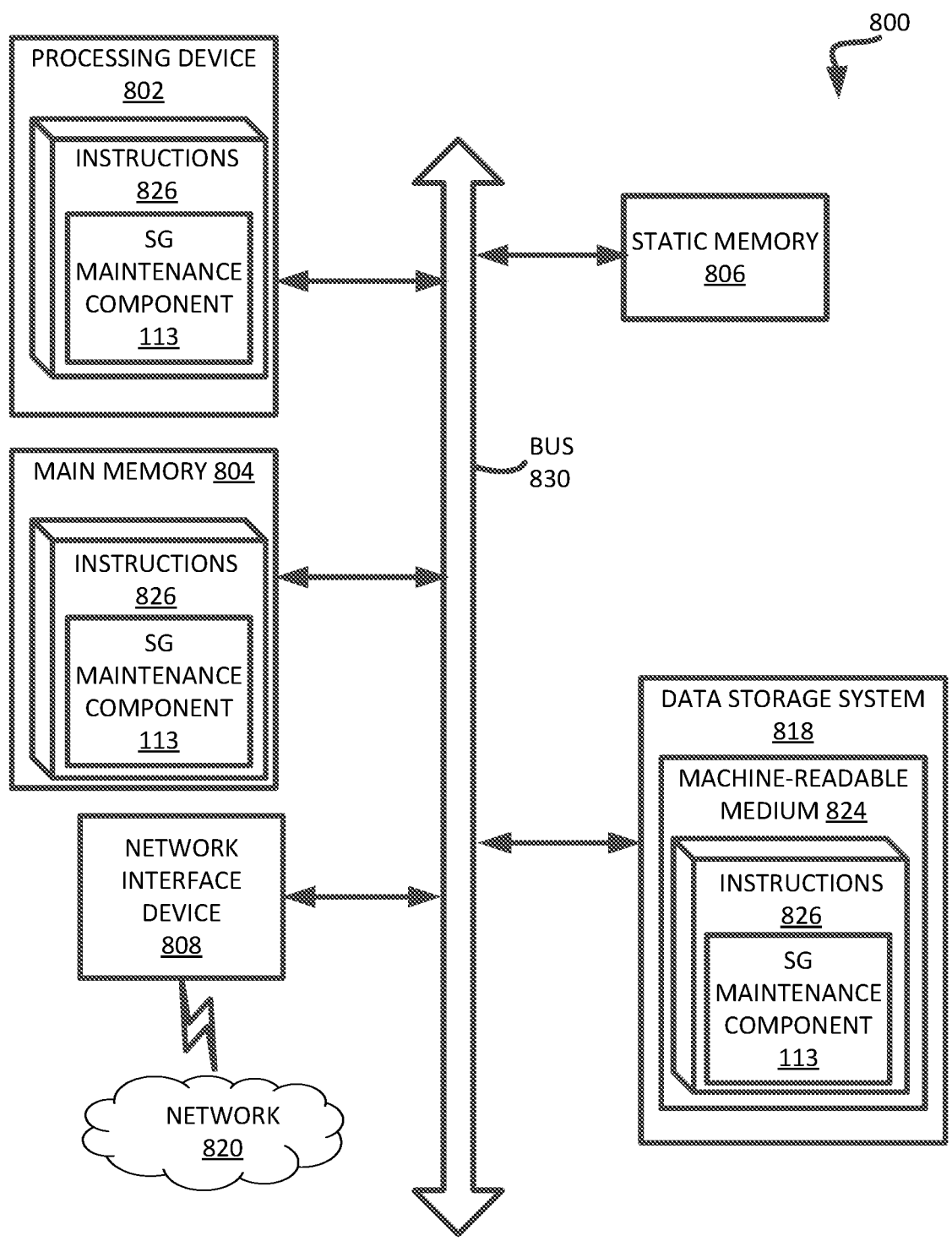
FIG. 8 is a block diagram of an example computer system in which embodiments of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the select gate maintenance component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to the select gate maintenance component 113 of FIG. 1. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled with the memory device, to perform operations comprising:
   determining a number of program/erase cycles performed on a block of the memory device;
   determining that the number of program/erase cycles performed on the block satisfies a first threshold criterion, wherein the first threshold criterion corresponds to a frequency interval for performing a threshold voltage integrity scan on the block;
   performing a threshold voltage integrity scan on the block to determine an error count associated with a current threshold voltage of at least one select gate device of the block;
   responsive to the error count associated with the current threshold voltage of the at least one select gate device satisfying a second threshold criterion, determining a rate of change associated with the current threshold voltage of the at least one select gate device; and
   updating, based on the rate of change, the frequency interval for performing a threshold voltage integrity scan on the block.

2. The system of claim 1, wherein determining that the number of program/erase cycles performed on the block satisfies the first threshold condition comprises:
   determining that the number of program/erase cycles performed on the block is greater than or equal to a threshold number of program/erase cycles, wherein the threshold number of program/erase cycles is equal to the frequency interval for performing a threshold voltage integrity scan on the block.

3. The system of claim 1, wherein performing the threshold voltage integrity scan on the block comprises:
   applying one or more read voltages to the at least one select gate device of the block;
   receiving one or more output values based on the one or more read voltages; and
   comparing the one or more output values to an expected output value based on a target threshold voltage.

4. The system of claim 1, wherein the processing device to perform further operations comprising:
comparing the error count associated with the current threshold voltage of the at least one select gate device to the second threshold criterion, wherein the error count satisfies the second threshold criterion when the error count is less than a threshold error count.

5. The system of claim 1, wherein updating the frequency interval comprises:
retrieving a look-up table, wherein the look-up table comprises one or more entries, each entry associated with a respective predefined frequency interval and an associated respective rate of change threshold window;
comparing a value of the rate of change to each of the respective rate of change threshold windows of the one or more entries;
determining that the value of the rate of change is within a first rate of change threshold window of a first entry;
identifying a first predefined frequency interval associated with the first rate of change threshold window of the first entry; and
updating the frequency interval with the first predefined frequency interval.

6. The system of claim 1, wherein the processing device to perform further operations comprising:
responsive to determining that the error count associated with the current threshold voltage of the at least one select gate device does not satisfy the second threshold criterion, performing a touch up operation on the at least one select gate device to adjust the current threshold voltage to a target threshold voltage.

7. The system of claim 1, wherein the processing device to perform further operations comprising:
responsive to determining that the error count associated with the current threshold voltage of the at least one select gate device does not satisfy the second threshold criterion, retiring the block.

8. A method comprising:
identifying a frequency interval for performing a threshold voltage integrity scan on a block of a memory device;
determining that a first number of program/erase cycles performed on the block satisfies the frequency interval;
performing a first threshold voltage integrity scan on the block to determine a first error count associated with a current threshold voltage of at least one select gate device of the block;
responsive to the first error count associated with the current threshold voltage of the at least one select gate device satisfying a threshold criterion, determining a rate of change associated with the current threshold voltage of the at least one select gate device;
updating, based on the rate of change, the frequency interval for performing a threshold voltage integrity scan on the block;
determining that a second number of program/erase cycles performed on the block satisfies the updated frequency interval; and
performing a second threshold voltage integrity scan on the block to determine a second error count associated with a current threshold voltage of the at least one select gate device of the block.

9. The method of claim 8, wherein determining that the first number of program/erase cycles performed on the block satisfies the frequency interval comprises:
determining that the first number of program/erase cycles performed on the block is greater than or equal to a threshold number of program/erase cycles, wherein the threshold number of program/erase cycles is equal to the frequency interval for performing a threshold voltage integrity scan on the block.

10. The method of claim 8, wherein performing the first threshold voltage integrity scan on the block comprises:
applying one or more read voltages to the at least one select gate device of the block;
receiving one or more output values based on the one or more read voltages; and
comparing the one or more output values to an expected output value based on a target threshold voltage.

11. The method of claim 8, further comprising:
comparing the first error count associated with the current threshold voltage of the at least one select gate device to the threshold criterion, wherein the first error count satisfies the threshold criterion when the first error count is less than a threshold error count.

12. The method of claim 8, wherein updating the frequency interval comprises:
retrieving a look-up table, wherein the look-up table comprises one or more entries, each entry associated with a respective predefined frequency interval and an associated respective rate of change threshold window;
comparing a value of the rate of change to each of the respective rate of change threshold windows of the one or more entries;
determining that the value of the rate of change is within a first rate of change threshold window of a first entry;
identifying a first predefined frequency interval associated with the first rate of change threshold window of the first entry; and
updating the frequency interval with the first predefined frequency interval.

13. The method of claim 8, further comprising:
responsive to determining that the first error count associated with the current threshold voltage of the at least one select gate device does not satisfy the threshold criterion, performing a touch up operation on the at least one select gate device to adjust the current threshold voltage to a target threshold voltage.

14. The method of claim 8, further comprising:
responsive to determining that the first error count associated with the current threshold voltage of the at least one select gate device does not satisfy the threshold criterion, retiring the block.

15. A non-transitory computer-readable storage medium comprising instructions that, when executed by a processing device, cause the processing device to perform operations comprising:
determining a number of program/erase cycles performed on a block of a memory device;
determining that the number of program/erase cycles performed on the block satisfies a first threshold criterion, wherein the first threshold criterion corresponds to a frequency interval for performing a threshold voltage integrity scan on the block;
performing a threshold voltage integrity scan on the block to determine an error count associated with a current threshold voltage of at least one select gate device of the block;
responsive to the error count associated with the current threshold voltage of the at least one select gate device satisfying a second threshold criterion, determining a rate of change associated with the current threshold voltage of the at least one select gate device; and updating, based on the rate of change, the frequency interval for performing a threshold voltage integrity scan on the block.

16. The non-transitory computer-readable storage medium of claim 15, wherein determining that the number of program/erase cycles performed on the block satisfies the first threshold condition comprises:
    determining that the number of program/erase cycles performed on the block is greater than or equal to a threshold number of program/erase cycles, wherein the threshold number of program/erase cycles is equal to the frequency interval for performing a threshold voltage integrity scan on the block.

17. The non-transitory computer-readable storage medium of claim 15, wherein performing the threshold voltage integrity scan on the block comprises:
    applying one or more read voltages to the at least one select gate device of the block;
    receiving one or more output values based on the one or more read voltages; and
    comparing the one or more output values to an expected output value based on a target threshold voltage.

18. The non-transitory computer-readable storage medium of claim 15, wherein the processing device to perform further operations comprising:
    comparing the error count associated with the current threshold voltage of the at least one select gate device to the second threshold criterion, wherein the error count satisfies the second threshold criterion when the error count is less than a threshold error count.

19. The non-transitory computer-readable storage medium of claim 15, wherein updating the frequency interval comprises:
    retrieving a look-up table, wherein the look-up table comprises one or more entries, each entry associated with a respective predefined frequency interval and an associated respective rate of change threshold window;
    comparing a value of the rate of change to each of the respective rate of change threshold windows of the one or more entries;
    determining that the value of the rate of change is within a first rate of change threshold window of a first entry;
    identifying a first predefined frequency interval associated with the first rate of change threshold window of the first entry; and
    updating the frequency interval with the first predefined frequency interval.

20. The non-transitory computer-readable storage medium of claim 15, wherein the processing device to perform further operations comprising:
    responsive to determining that the error count associated with the current threshold voltage of the at least one select gate device does not satisfy the second threshold criterion, performing a touch up operation on the at least one select gate device to adjust the current threshold voltage to a target threshold voltage.

* * * * *